United States Patent
Thompson

(10) Patent No.: US 8,029,399 B2
(45) Date of Patent: Oct. 4, 2011

(54) COMPOUND PLANET STEER DIFFERENTIAL

(75) Inventor: Robert William Thompson, Hampshire (GB)

(73) Assignee: Qinetiq Limited (GB)

( * ) Notice: Subject to any disclaimer, the term of this patent is extended or adjusted under 35 U.S.C. 154(b) by 714 days.

(21) Appl. No.: 12/159,435

(22) PCT Filed: Dec. 15, 2006

(86) PCT No.: PCT/GB2006/004694
§ 371 (c)(1),
(2), (4) Date: Jun. 27, 2008

(87) PCT Pub. No.: WO2007/077416
PCT Pub. Date: Jul. 12, 2007

(65) Prior Publication Data
US 2008/0300080 A1 Dec. 4, 2008

(30) Foreign Application Priority Data
Jan. 6, 2006 (GB) .................................. 0600154.9

(51) Int. Cl.
*F16H 48/30* (2006.01)
*F16H 57/08* (2006.01)
*B62D 11/06* (2006.01)
*B62D 11/00* (2006.01)

(52) U.S. Cl. .......... 475/150; 475/18; 475/339; 180/6.44

(58) Field of Classification Search .................... 475/18, 475/28, 150, 339, 203–205, 5, 6; 180/6.2, 180/6.44, 6.48, 6.5, 372, 65.1, 65.6
See application file for complete search history.

(56) References Cited

U.S. PATENT DOCUMENTS

| 4,774,857 A | 10/1988 | Heine et al. | |
|---|---|---|---|
| 4,813,506 A * | 3/1989 | Smith | 180/6.44 |
| 5,195,600 A * | 3/1993 | Dorgan | 180/9.1 |
| 7,326,141 B2 * | 2/2008 | Lyons et al. | 475/28 |
| 2001/0008859 A1 * | 7/2001 | Masaki | 475/5 |
| 2010/0105511 A1 * | 4/2010 | Thompson | 475/6 |

FOREIGN PATENT DOCUMENTS

| DE | 644 547 | 5/1937 |
|---|---|---|
| DE | 19 13 967 | 4/1965 |
| EP | 1 167 818 | 1/2002 |
| WO | WO 02/083483 | 10/2002 |
| WO | WO 2005/054712 | 6/2005 |
| WO | WO 2006/021745 | 3/2006 |

* cited by examiner

*Primary Examiner* — Roger Pang
(74) *Attorney, Agent, or Firm* — McDonnell Boehnen Hulbert & Berghoff LLP

(57) ABSTRACT

A drive configuration for a skid steered vehicle incorporates a controlled differential for use in exercising steering control of the vehicle, comprising a compound planetary gear set (8) coupling two shafts (7a, 7b). Respective sun gears (10a) and (10b) turn with the shafts and mesh with compound planet gears (12) in a common planet carrier (13), the ratios of the number of gear teeth between each sun gear and the respective gears (14a) or (14b) of the compound planets being unequal so that when the planet carrier is stationary the two shafts are coupled through the differential to turn together in the same sense but with a speed difference, and controlled rotation of the planet carrier varies the speed difference between the shafts in accordance with the sense and speed of rotation of the planet carrier.

5 Claims, 2 Drawing Sheets

COMPOUND PLANET STEER DIFFERENTIAL

BACKGROUND OF THE INVENTION

Field of the Invention

The present invention relates to a drive configuration for a skid steered vehicle incorporating a controlled differential for use in exercising steering control of the vehicle. Particular applications include the steering of a battle tank, bulldozer or other skid steered vehicle equipped with a drive configuration of the kind described in WO-02/083483 or WO-2006/021745, where the controlled differential to be described herein is used as an alternative to the double epicyclic controlled differential disclosed therein.

SUMMARY OF THE INVENTION

In one aspect the invention resides in a drive configuration for a skid steered vehicle comprising: a respective drive member (such as a track drive sprocket for a tracked vehicle or a wheel hub for a wheeled vehicle) adapted to be located at each side of the vehicle; at least one propulsion motor coupled between said drive members; a controlled differential coupled between a pair of shafts each of which is arranged to be coupled to a respective said drive member; and at least one steer motor coupled to said controlled differential to control the relative speeds of said shafts for steering control of the vehicle; wherein the controlled differential comprises:

first and second sun gears arranged to turn with respective said shafts;

a compound planetary gear set comprising one or more compound planet gears and a common planet carrier, a first planet gear of the or each said compound planet being in mesh with the first sun gear and a second planet gear of the or each said compound planet being in mesh with the second sun gear;

the ratios of the number of gear teeth between the first sun gear and the or each said first planet gear and between the second sun gear and the or each said second planet gear being unequal;

and wherein said steer motor is coupled to control the rotation of said planet carrier; whereby if the planet carrier is stationary the two shafts are coupled through said sun gears and compound planet gears to turn together in the same sense with a speed difference; and rotation of the planet carrier varies the speed difference between the two shafts, the sense and magnitude of which variation depend respectively on the sense and speed of the rotation of the planet carrier.

DESCRIPTION OF FIGURES

The manner of operation and other features of a differential and drive configuration according to the invention will now be more particularly described, by way of example, with reference to the accompanying drawings, in which.

DESCRIPTION OF PREFERRED EMBODIMENTS

Figure 1:
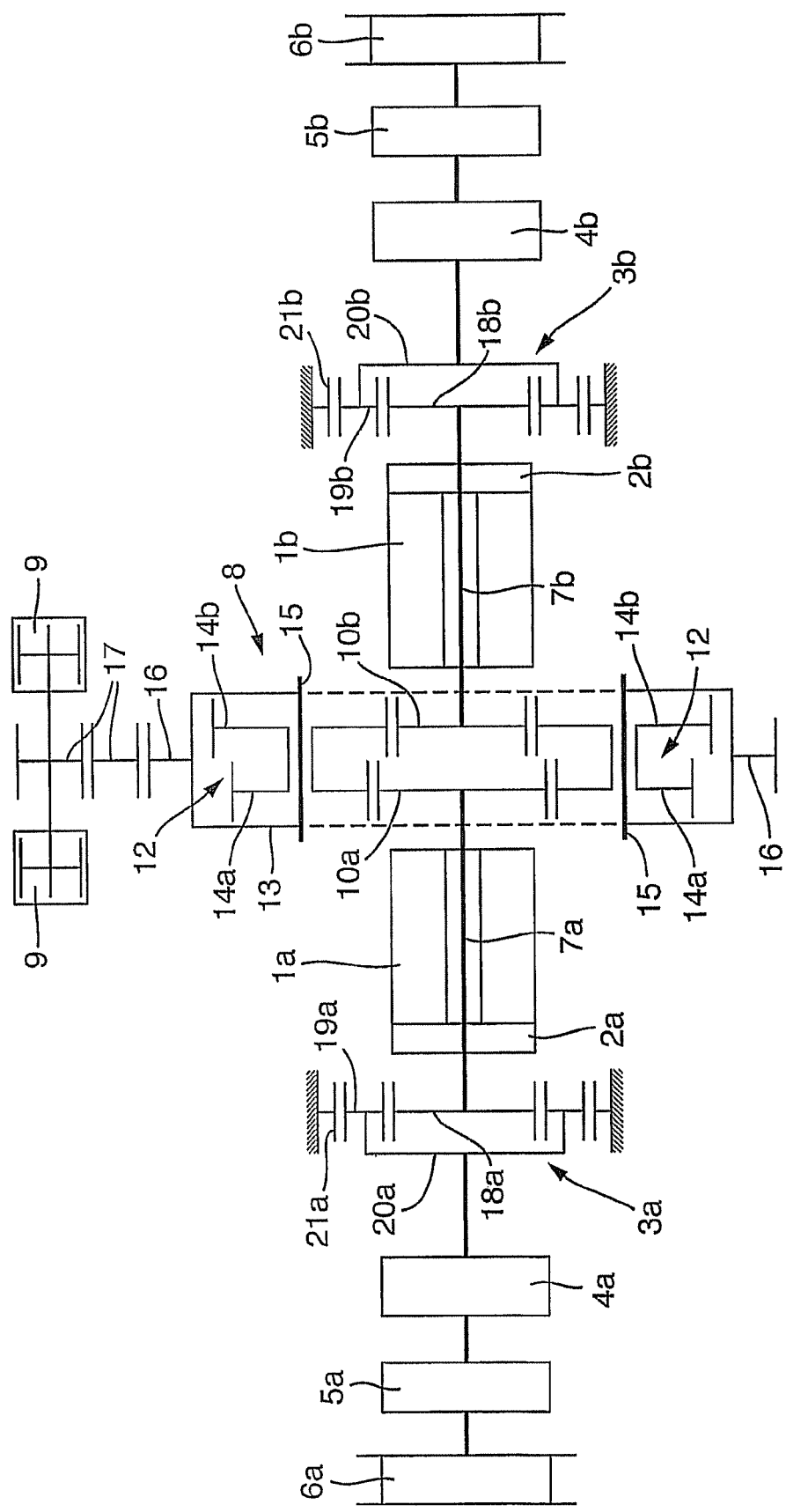
FIG. 1 is a diagrammatic representation of one embodiment of a controlled differential as used in a drive configuration according to the invention.

FIG. 1 illustrates diagrammatically one form of vehicular drive configuration within which the present invention may be found particularly useful, being a track drive arrangement for a skid steered vehicle according to WO-02/083483. In this Figure a transverse drive arrangement comprises two electric propulsion motors $1a$ and $1b$. Outboard of the motors the transmission includes in each case a gear (range) change unit $2a$, $2b$, planetary gear reduction stage $3a$, $3b$, brake $4a$, $4b$ and final drive gear reduction $5a$, $5b$, leading to respective track drive sprockets $6a$ and $6b$ at opposite sides of the vehicle. Inboard the motor drive shafts $7a$ and $7b$ are coupled to opposite sides of a controlled differential 8 which can be driven by a coupled pair of electric steer motors 9.

Each range change mechanism $2a$, $2b$ may be as described in WO-05/054712 and is integrated with the respective propulsion motor $1a$, $1b$ so that the shafts $7a$, $7b$ are driven by the motor rotors through the range change mechanisms and steering remains effective while making a gear change due to the permanent connection of the transmissions to the differential through shafts $7a$, $7b$, as described in WO-2006/021745. The components comprising propulsion motors $1a$, $1b$, range change mechanisms $2a$, $2b$, gear reductions $3a$, $3b$ and controlled differential 8 may all be housed in a common generally cylindrical casing extending transversely of the vehicle as also shown in WO-2006/021745.

Figure 2:
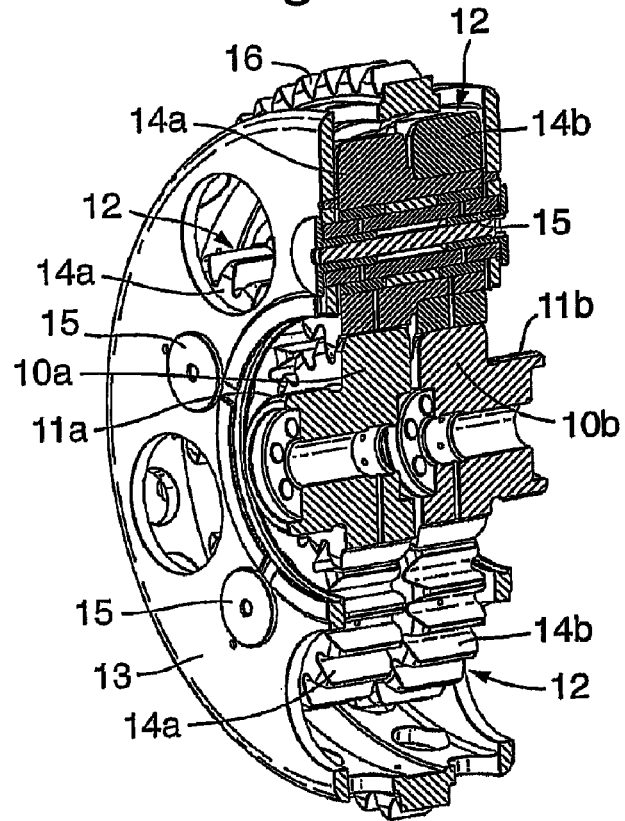
FIG. 2 is a pictorial half-section through a physical embodiment of the differential of FIG. 1.
Figure 3:
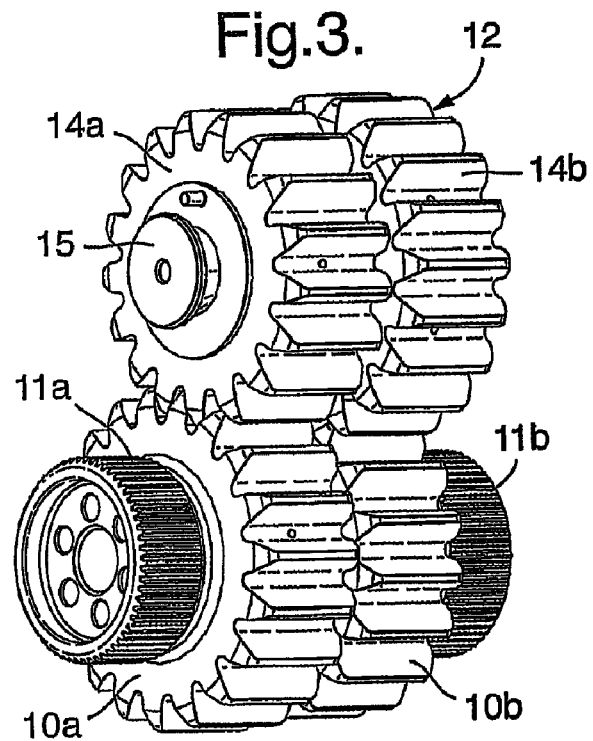
FIG. 3 is a pictorial view, to a larger scale, illustrating the mesh between the sun gears and one of the compound planet gears in the differential of FIGS. 1 and 2.

The mechanism of the controlled differential 8 is based on a parallel pair of planetary gear sets but comprising linked (compound) planet gears in a common planet carrier. More particularly, and referring also to FIGS. 2 and 3, respective sun gears $10a$ and $10b$ are attached, as by splines $11a$, $11b$, to respective drive shafts $7a$, $7b$. In the illustrated embodiment sun gear $10a$ is of larger diameter and has a higher number of gear teeth than sun gear $10b$. Each sun gear $10a$, $10b$ meshes with respective gear portions of a set of, say, five compound planet gears 12 carried by a planet carrier 13. Each compound planet 12 comprises a parallel pair of gears $14a$, $14b$ united so as to turn together on a common axis—such as by welding two separate elements together or by cutting two sets of gear teeth on a single element—and borne on pins 15 held in the carrier 13. In the illustrated embodiment the gears $14b$ in each compound planet are of larger diameter and have a higher number of gear teeth than the gears $14a$. Gears $14a$ are in mesh with planet gear $10a$ and gears $14b$ are in mesh with sun gear $10b$. The planet carrier 13 is borne for rotation independently of the shafts $7a$, $7b$ and is formed with an external ring of gear teeth 16 by which it can be driven to rotate by the steer motors 9 through a spur gear train 17.

It will be appreciated that the mechanism of the differential 8 provides a permanent torque-transmitting connection between the shafts $1a$ and $1b$ by virtue of the meshing of both sun gears $10a$ and $10b$ with the same set of compound planet gears 12. The way in which this can be controlled to steer the vehicle will now be described.

Firstly let it be assumed that the steer motors 9 are energised to hold the planet carrier 13 stationary, and that this is the condition which is intended to pertain for straight line running of the vehicle. Energising the propulsion motors $1a$, $1b$ to turn the drive shafts $7a$, $7b$ in this condition rotates the sun gears $10a$, $10b$ to cause the planets 12 to rotate in the stationary carrier 13. The power distribution between the two shafts $7a$ and $7b$ will be determined by the torque required to drive the respective sprocket $6a$, $6b$, with torque being transferred through the differential from one side to the other as required e.g. in response to changing ground conditions.

However by virtue of the inequality of the gear ratios between the sun gears 10a, 10b, and the respective gears 14a, 14b of the compound planets 12 with which they mesh, the shafts 7a and 7b will be forced to run at different speeds. In the illustrated embodiment, considering the connection through the differential from sun gear 10a to sun gear 10b, there is an increase in speed from the larger sun gear 10a to the smaller planet gears 14a and a further increase in speed from the larger planet gears 14b (which must turn at the same speed as the planet gears 14a) to the smaller sun gear 10b; (the inverse is of course true considering the connection from sun gear 10b to sun gear 10a). In other words in the illustrated embodiment, while the planet carrier 13 is stationary, shaft 7b must turn faster than shaft 7a.

It will be appreciated that, with the shafts 7a and 7b running at different speeds in this condition, if the same speed difference is (proportionally) reflected through the remainder of the transmissions between respective shafts 7a, 7b and sprockets 6a, 6b then the vehicle will not run straight but will turn. For this reason the gear ratios of the intervening reduction stages 3a and 3b are chosen to differ to compensate as nearly as practicable for the "straight running" speed difference between the shafts 7a and 7b. Each such reduction stage comprises a planetary gear mechanism with a sun gear 18a, 18b coupled to the respective shaft 7a, 7b, a set of conventional planet gears 19a, 19b in a carrier 20a, 20b which is coupled to the outboard transmission train, and a fixed annulus or ring gear 21a, 21b, with the tooth numbers of the gear elements chosen to achieve the desired reduction ratios between the suns and carriers.

In any given transmission arrangement where the ratios of the various gear elements do not compensate fully for the speed difference between the shafts 7a, 7b for straight line running, the planet carrier 13 can be run by the steer motors 9 to make up for any remaining difference as seen at the drive sprocket 6a, 6b (the manner by which turning of the carrier 13 varies the speed difference between shafts 7a, 7b being explained below). For example in one particular embodiment the chosen tooth numbers for each gear in the differential 8 and reduction stages 3a, 3b are as follows:—

| | |
|---|---|
| sun gear 10a | 19 teeth |
| sun gear 10b | 17 teeth |
| planet gears 14a | 17 teeth |
| planet gears 14b | 19 teeth |
| sun gear 18a | 30 teeth |
| sun gear 18b | 23 teeth |
| planet gears 19a | 17 teeth |
| planet gears 19b | 22 teeth |
| ring gear 21a | 67 teeth |
| ring gear 21b | 67 teeth |

This results in a gear ratio across the differential 8 with a stationary carrier 13 of (to three decimal places) 1:1.249, a reduction ratio in stage 3a of 3.16:1 and a reduction ratio in stage 3b of 3.913:1. The compensatory ratio between the two reduction stages is therefore (to three decimal places) 1.238:1 which leaves a minor shortfall to be compensated by turning the carrier 13 for straight line running.

To turn the vehicle while being propelled by the motors 1a, 1b the steer motors 9 are energised to rotate the planet carrier 13 of the differential 8 in the direction and at the speed which will vary the speed difference between the shafts 7a, 7b to the extent that, taking account of the different reduction ratios in stages 3a and 3b, a speed difference is imposed on the sprockets 6a, 6b to turn the vehicle in the direction and at the rate required, while power from the side of the transmission with the slower running sprocket is regenerated to the faster running side through the differential. Turning the planet carrier 13 causes the compound planet gears 12 to revolve around the sun gears 10a, 10b and in so doing they will alter the effective gear ratio operating between those suns and thus alter the speed difference between the shafts 7a, 7b. This is due to the inequality of the gear ratios between the sun gears 10a, 10b and the respective gear portions 14a, 14b of the compound planets 12 with which they mesh.

The above effect can be conceptualised by considering the relationship between the sun gears 10a, 10b and one of the compound planet gears 12 in FIG. 13. Imagine that sun gear 10a is held stationary and compound gear 12 is revolving around the same anticlockwise as viewed end-on from the left of FIG. 3. This motion will also cause gear 12 to rotate in the planet carrier 13 at a rate determined by the ratio of the numbers of teeth on the gears 10a and 14a. Gear 14b will also be caused to rotate at the same rate as it revolves around sun gear 10b because it is fast with gear 14a, in so doing causing sun gear 10b to rotate at a rate determined by the difference between the ratios of the numbers of gear teeth between the sun gears 10a, 10b and respective planet gears 14a, 14b. In the illustrated example this rotation of sun gear 10b will be clockwise as viewed end-on from the left of FIG. 3 because there is a higher ratio of gear teeth from gear 14b to gear 10b than there is from gear 14a to gear 10a and gear 10a must therefore be driven in reverse to the sense of revolution of the planet gears to compensate for the fact that gear 14b must rotate by the same amount as gear 14a per revolution of the compound planet 12. Reversing the direction of rotation of the planet carrier under these conditions of course reverses the direction of imposed rotation on gear 10b. Furthermore the faster that the carrier 13 turns in either direction the faster must gear 10b turn with respect to the (assumed stationary in this case) gear 10a. A similar but inverse analysis applies to the rotation of sun gear 10a if it is imagined that sun gear 10b is held stationary and the planet carrier is rotated. Of course equivalent effects occur in the dynamic situation when the gears 10a, 10b on shafts 7a, 7b are already being turned by the propulsion motors 1a, 1b, the relative rotation between the sun gears due to revolution of the planet gears with the rotating carrier then effectively being added/subtracted to the speed difference between the shafts 7a, 7b inherent with a stationary carrier.

In the particular example of gear tooth numbers quoted above it will be noted that the gear ratios between the sun gears 10a, 10b and their respective planet gears 14a, 14b are reciprocal, which may be convenient for manufacturing purposes but is in no way essential—all that is required to exhibit the desired speed controlling effect is an inequality in these ratios. One of these ratios could be 1:1 if desired. Also while it is preferable to compensate at least to some extent for the inherent speed difference between the shafts 7a, 7b by means of different gear ratios in the reduction stages 3a, 3b for straight line running, this could all be achieved by rotation of the planet carrier 13 if desired and if suitably rated steer motors are employed.

The invention claimed is:
1. A drive configuration for a skid steered vehicle comprising:
   a respective drive member adapted to be located at each side of the vehicle;
   a controlled differential coupled between a pair of shafts each of which is arranged to be coupled to a respective said drive member;

a pair of propulsion motors, a respective one of which is coupled between each said shaft and the respective said drive member; and at least one steer motor coupled to said controlled differential to control the relative speeds of said shafts for steering control of the vehicle; wherein the controlled differential comprises:

first and second sun gears arranged to turn with respective said shafts;

a compound planetary gear set comprising one or more compound planet gears and a common planet carrier, a first planet gear of the or each said compound planet being in mesh with the first sun gear and a second planet gear of the or each said compound planet being in mesh with the second sun gear; the ratios of the number of gear teeth between the first sun gear and the or each said first planet gear and between the second sun gear and the or each said second planet gear being unequal; and wherein said steer motor is coupled to control the rotation of said planet carrier; whereby if the planet carrier is stationary the two shafts are coupled through said sun gears and compound planet gears to turn together in the same sense with a speed difference; and rotation of the planet carrier varies the speed difference between the two shafts, the sense and magnitude of which variation depend respectively on the sense and speed of the rotation of the planet carrier.

2. A drive configuration according to claim 1 further comprising respective gear reduction stages between respective said shafts and drive members, the gear reduction ratios of which stages are unequal and reduce the speed ratio between said drive members as compared to the speed ratio between said shafts when said planet carrier is stationary.

3. A drive configuration according to claim 2 wherein the gear reduction ratios of said stages are chosen to approximately equalise the speeds of said drive members when said planet carrier is stationary.

4. A drive configuration according to claim 1 for a tracked vehicle, wherein said drive members are track drive sprockets.

5. A vehicle equipped with a drive configuration according to claim 1.

* * * * *